Aug. 2, 1927.
T. L. E. HAUG
1,637,771
WEDGE
Filed April 23, 1923
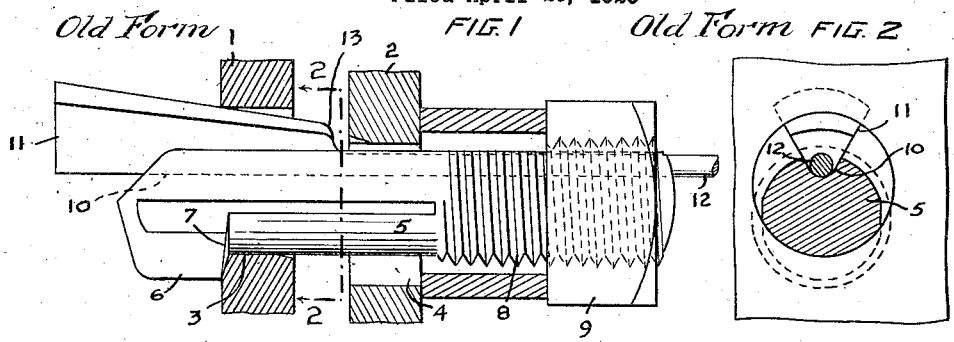
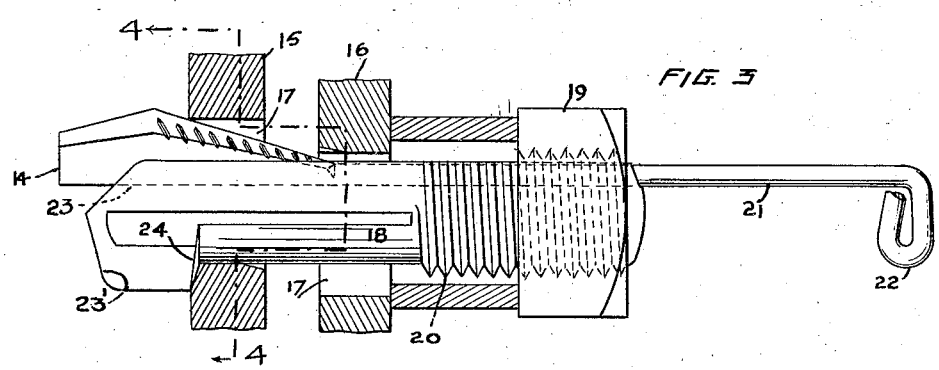
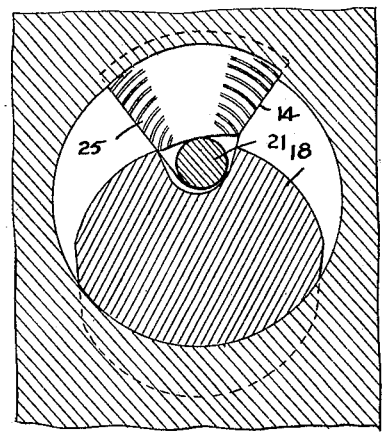
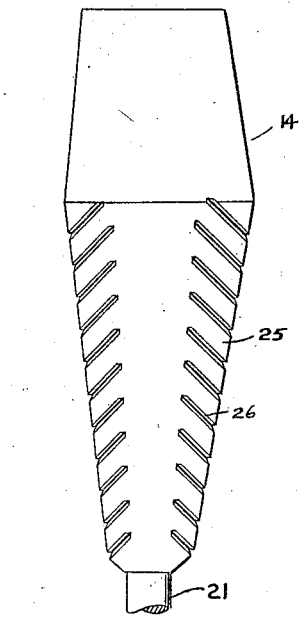
FIG. 4
FIG. 5
FIG. 6
INVENTOR
T. L. E. HAUG
ATT'YS.

Patented Aug. 2, 1927.

1,637,771

UNITED STATES PATENT OFFICE.

THADDEUS L. E. HAUG, OF BERKELEY, CALIFORNIA.

WEDGE.

Application filed April 23, 1923. Serial No. 633,896.

This invention relates to improvements in wedges and particularly to wedges of the type employed in fitting up bolts as exemplified in my U. S. Letters Patent No. 1,404,955, granted January 31, 1922.

The primary object of the invention is to provide a wedge which may be easily and effectively wedged in place and will remain in proper wedging position regardless of irregularities in the construction of the work or other elements with which the wedge is employed.

It frequently happens in fitting up plate work preliminary to riveting or permanent assembling operations, that the holes in the plates do not aline properly and when employing fitting up bolts of the type above referred to having the ordinary wedge associated therewith, in drawing the plate work together while the wedge is engaged with one of the plates, the other of the plates may engage the wedge and push it out of place and thereby permit the head or abutment end of the bolt to shift out of place and to also shear away some of the metal of the plate with which the head or abutment is engaged.

Another objection sometimes attending the use of fitting up bolts of the type above referred to wherein the wedge is not of the special construction as exemplified by the present invention, is that when tightening up the nut on the bolt, the wedge tends to slip out of place in an axial direction, due to pressure from the bolt and to the vibration of pneumatic riveting on adjoining parts of the structure being bolted. Under these conditions the wedge sometimes fails to hold the bolt properly in place.

The present invention contemplates a wedge construction which will, when the nut is tightened on the bolt, positively prevent the wedge from slipping axially out of place because of lateral pressure or vibration.

The invention therefore relates to the provision of a wedge and an improved fitting up bolt provided by reason of the improved wedge, which bolt will do away with the objections herein referred to and produce a saving in labor and expense as compared to previous types of fitting up bolts.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 is a side elevation of the bolt of U. S. Patent No. 1,404,955 as arranged when drawing two plates or structural members together.

Fig. 2 is a cross section of the bolt of U. S. Patent No. 1,404,955 taken on the line 2—2 of Fig. 1, and looking toward the abutment end of the bolt.

Fig. 3 is a side elevation of the bolt of the present invention, as arranged when drawing two structural members together.

Fig. 4 is an enlarged cross section of the bolt of the present invention, taken on line 4—4 of Fig. 3, and looking toward the abutment end of the bolt.

Fig. 5 is an enlarged top view of the wedge of the bolt of the present invention, looking down on Fig. 3 from a point in the plane of the drawing.

Fig. 6 is an enlarged elevation of the wedge, looking at Fig. 5 from the right hand side.

In Figs. 1 and 2 of the drawing I have shown the construction as exemplified in my U. S. Letters Patent herein above referred to, and in these figures, 1 and 2 represent plates or structural members which are to be set up by the bolt and which are provided with registering holes 3 and 4 adapted to receive the bolt body 5. The bolt body has an offset abutment member or head 6 defining a locking shoulder 7 adapted to engage the outside of the plate 1. The bolt body is also provided with screw threads 8 at its other end and on said screw threads a nut 9 is turned. The bolt body is provided with a channel 10 in which a wedge 11 is slidable longitudinally. The wedge is provided with a stem 12, which extends beyond the threaded end of the bolt so that it is available for drawing the wedge in place. With the wedge in the position shown in Fig. 1, as the nut is turned to tighten the bolt and the plate 2 is drawn toward the plate 1, before the plates contact, the plate 2 may foul the inner end or toe 13 of the wedge and push the wedge out of place. If this occurs the abutment 6 may slip partially or entirely off of its bearing on the plate 1. Even if it slips off only partially, the bolt moves away from the side of the hole directly under the abutment and the pressure from the latter caused by the pull on the bolt may be so intense that the side of the hole will become burred inwards and interfere with the ready removal of the bolt afterwards. Objections of this sort are time consuming and costly. Although these occasions do not frequently occur they will take place in certain intances where the holes do not properly aline, often enough to warrant correction.

As shown in Figs. 3, 4, 5 and 6, the wedge 14 of my invention is provided with a uniform slope on its wedge face, which face is comparatively wide and curved, there being no toe as provided in the previous form of wedge particularly illustrated in Figs. 1 and 2. Thus when the plates 15 and 16 having openings 17 therein, in which the bolt 18 is mounted, are pulled together upon tightening the nut 19 on the screw threaded end 20 of the bolt body, the wedge will not be fouled and pushed out of engagement with the plate member 16. The wedge 14 is of hard material and is welded or otherwise secured to a bendable, softer metal stem 21 having a finger piece 22 on its outer end. The wedge and stem are adapted to engage in a channel or groove 23 extending longitudinally of the bolt body. The bolt body is provided at one end with an offset head or abutment 23′ defining a shoulder 24 adapted to abut the plate 15. In all respects the bolt body and its associated parts, with the exception of the wedge in the present invention, are the same as the corresponding parts in the embodiment of the invention illustrated in Figs. 1 and 2, the present invention as hereinbefore stated, dealing specifically with the construction and arrangement of the wedge.

Due to the slope of the wedge face 25 and the absence of the toe, the wedge can only be moved axially along the bolt surface and upon engagement of the plate 16 with the wedging surface, the bolt will not be permitted to move laterally and will be held in place and prevent disengagement of the shoulder 24 with the plate 15.

In order to avoid the necessity of making the wedge stem 21 comparatively long and to provide additional clearance for the wedge in unfair holes, it is advisable to form the wedge face with a steep slope relative to the axis of the bolt body. In addition to this, means, as will be disclosed hereinafter, is provided in the wedge which permits of the use of this steep slope without danger of the wedge slipping out of the hole under lateral pressure and vibration, due to riveting the work, and without danger of the wedge failing to grip in the hole in said plate. This means will also prevent the bolt from turning when the nut is tightened.

As the nut 19 is screwed up in a clockwise direction, its friction on the bolt threads tends to rotate the bolt, and to prevent this rotation, the operator pulls outwardly on the stem 21 to force the wedge surface 25 into engagement with the side of the hole in the plate 15. The friction thus set up together with the turning of the body 18 (Fig. 4) causes a lateral toggle action due to the manner of mounting the wedge in the groove or channel, which toggle action tends to prevent rotation of the bolt body, the sloping corner 27 of the wedge indenting the side of the hole sufficiently to cause such action, the material of the wedge being harder than the material of the plates or structural members. When this occurs the wedge slope on the corner 27 may allow the wedge to slip gradually out of the hole of the plate 15 due to the lateral pressure of the body 18, or due to the vibration of the pneumatic riveting operation taking place adjacent to the setting up point. To prevent this slipping of the wedge, I provide diagonally disposed notches, valleys or depressions 26 on the wedge surface 25, which notches or depressions intersect the corners or edges 27 of the wedge surface. The grooves or depressions are preferably placed in a direction pointing from the corners 27 at the edges of the wedge surface and diagonally toward the top of the wedge slope or thickest portion of the wedge. Where the softer metal of the plate 15 presses against the wedge, it tends to sink into the notches, grooves or depressions of the harder wedge material so that the wedge can then slip out only by rocking over in such a way as to further indent the side of the hole in the plate, (Fig. 5). The convergence of the grooves or depressions 26 insures a positive grip of the wedge, which prevents rotation of the bolt 1, for if the wedge is carried around with the bolt upon rotation of the latter, the grooves or depressions 26 tend to force the wedge more firmly and further into the hole 17 due to the diagonal disposition of the depressions 26 and thus jam the bolt against further turning. While it is apparent that the valleys or grooves could run squarely across the surface 25, or a portion thereof, and thus limit slipping of the wedge from the hole in the plate 15, I prefer the diagonal arrangement because of the advantages above pointed out resulting therefrom.

Although the bolt could be held against turning by providing a knurled wedge surface, the diagonal gashes or depressions exemplified in this invention are more advantageous to pull the wedge longitudinally into place by cooperation of the wedge with the softer surrounding metal of the plate 15.

Moreover, the gashes or grooves are more durable or lasting than knurling, as they suffer less obliteration through corrosion and through the intense pressure on the wedge surface. The gashes or the grooves may be more economically cut or formed than knurling by employing suitably spaced metal slitting saws or stamping with a multiple edged tool in a drop press.

In the drawing, the diagonally disposed grooves or depressions have been shown on both right and left hand sides of the wedging surface. Those on the right hand or leading side come into operation when the bolt is being tightened and maintain the bolt in fastened position, whereas those on the left or following side of the wedge surface are of service only in slackening off the bolt for removal from the work and can be omitted without impairing the efficiency of the bolt as a fastening device.

I claim:

1. A bolt having an abutment at each end and means which may be moved into and out of position to lock said bolt against withdrawal and to permit its release while both of the abutments are maintained in fixed position on the bolt, which means includes a wedging surface provided with grooves extending in a direction across said surface.

2. A bolt having an abutment at each end and means which may be moved into and out of position to lock said bolt against withdrawal and to permit its release while both of the abutments are maintained in fixed position on the bolt, which means includes a wedging surface provided with grooves extending in a direction diagonally across said surface.

3. A bolt comprising a body having an abutment at each end and a wedge associated with the body for the purpose of locking the bolt against withdrawal from an opening into which it has been inserted, the extremities of which wedge are capable of extension beyond the abutments, said wedge having grooves extending in a direction across a wedging surface thereof.

4. A bolt comprising a body having an abutment at each end and a wedge associated with the body for the purpose of locking the bolt against withdrawal from an opening into which it has been inserted, the extremities of which wedge are capable of extension beyond the abutments, said wedge having grooves extending in a direction diagonally across a wedging surface thereof.

5. A fitting up bolt comprising a bolt or abutment member to secure structural work, and a wedge member of harder material than the structural work to hold said bolt or abutment member in fastening position, said wedge member having one or more grooves placed diagonally crosswise of its wedging surface.

THADDEUS L. E. HAUG.